US010862731B1

(12) United States Patent
Cox et al.

(10) Patent No.: US 10,862,731 B1
(45) Date of Patent: Dec. 8, 2020

(54) UTILIZING DEMONSTRATION DATA BASED ON DYNAMICALLY DETERMINING FEATURE AVAILABILITY

(71) Applicant: EMC Corporation, Hopkinton, MA (US)

(72) Inventors: Timothy Cox, Mendon, MA (US); Norman Miles, Bedford, MA (US); Scott Joyce, Foxboro, MA (US); Donald Labaj, Northborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 687 days.

(21) Appl. No.: 13/929,516

(22) Filed: Jun. 27, 2013

(51) Int. Cl.
G06F 15/16 (2006.01)
H04L 29/06 (2006.01)

(52) U.S. Cl.
CPC .............................. H04L 29/06047 (2013.01)

(58) Field of Classification Search
CPC ..... G06F 8/65; G06F 8/30; G06F 8/60; G06F 8/70; G06F 8/71
USPC ........................................................ 709/203
See application file for complete search history.

(56) References Cited

U.S. PATENT DOCUMENTS

| 8,326,794 | B1 | 12/2012 | Wood et al. | |
| 8,555,273 | B1* | 10/2013 | Chia | G06F 8/665 |
| | | | | 717/168 |
| 8,886,995 | B1 | 11/2014 | Pallapothu et al. | |
| 9,032,386 | B1* | 5/2015 | Vaynshteyn | G06F 8/65 |
| | | | | 717/168 |
| 9,038,051 | B1* | 5/2015 | Zweifel | G06F 8/65 |
| | | | | 717/169 |
| 9,063,818 | B1* | 6/2015 | Risbood | G06F 8/65 |
| 9,336,340 | B1 | 5/2016 | Dong et al. | |
| 9,557,983 | B1 | 1/2017 | Chan et al. | |
| 2004/0261070 | A1* | 12/2004 | Miller | G06F 8/71 |
| | | | | 717/170 |
| 2005/0091216 | A1* | 4/2005 | Kranz | G06F 17/30887 |
| 2006/0106585 | A1* | 5/2006 | Brown | G06F 8/20 |
| | | | | 703/1 |
| 2006/0259904 | A1* | 11/2006 | Celli | G06F 8/61 |
| | | | | 717/174 |
| 2007/0156842 | A1* | 7/2007 | Vermeulen | H04L 29/06047 |
| | | | | 709/217 |

(Continued)

Primary Examiner — S M A Rahman
(74) Attorney, Agent, or Firm — BainwoodHuang

(57) ABSTRACT

Described are methods, systems, and apparatus, including computer program product for selectively utilizing demonstration data based on dynamically determining feature availability on computer systems. A first request is received from a client device for computer system feature data related to a computer system feature. A second request is sent to a computer system to invoke by the computer system the computer system feature. Response computer system feature data including feature status information is received. The computer system feature data is formed based on the response computer system feature data, if the feature status information indicates that the computer system feature is available on the computer system. The computer system feature data is formed based on demonstration data, if the feature status information indicates that the computer system feature is not available on the computer system. The computer system feature data is sent to the client device.

16 Claims, 5 Drawing Sheets

(56) References Cited

U.S. PATENT DOCUMENTS

| | | | | |
|---|---|---|---|---|
| 2007/0244824 A1* | 10/2007 | Motley | G06F 21/123 | 705/59 |
| 2009/0037452 A1* | 2/2009 | Baitalmal | G06F 16/27 | |
| 2009/0037492 A1* | 2/2009 | Baitalmal | G06F 16/27 | |
| 2009/0144725 A1* | 6/2009 | Vrhel, Jr. | G06F 8/60 | 717/174 |
| 2009/0222806 A1* | 9/2009 | Faus | G06F 8/63 | 717/168 |
| 2009/0282401 A1* | 11/2009 | Todorova | G06F 8/61 | 717/175 |
| 2010/0180040 A1* | 7/2010 | Friedman | H04L 63/10 | 709/229 |
| 2010/0202450 A1* | 8/2010 | Ansari | G06Q 30/04 | 370/389 |
| 2011/0126190 A1* | 5/2011 | Urbach | G06F 9/44521 | 717/178 |
| 2011/0131565 A1* | 6/2011 | Vidal | G06F 8/65 | 717/175 |
| 2011/0239210 A1* | 9/2011 | Kotani | G06F 8/65 | 717/171 |
| 2011/0239214 A1* | 9/2011 | Frields | G06F 9/45533 | 718/1 |
| 2012/0036220 A1* | 2/2012 | Dare | G06F 8/61 | 709/217 |
| 2012/0131541 A1* | 5/2012 | Anetseder | G06F 17/5054 | 717/101 |
| 2012/0226933 A1* | 9/2012 | Baptist | G06F 11/0727 | 714/6.2 |
| 2012/0297378 A1* | 11/2012 | Shapiro | G06F 8/61 | 717/177 |
| 2013/0007710 A1* | 1/2013 | Vedula | G06F 9/5061 | 717/124 |
| 2013/0036102 A1* | 2/2013 | Goyal | G06N 5/02 | 707/694 |
| 2013/0036402 A1* | 2/2013 | Mutisya | G06F 11/3688 | 717/124 |
| 2013/0047149 A1* | 2/2013 | Xu | G06F 8/61 | 717/175 |
| 2013/0054682 A1* | 2/2013 | Malik | G06F 8/60 | 709/203 |
| 2013/0110766 A1* | 5/2013 | Promhouse | G06F 9/466 | 707/607 |
| 2013/0159452 A1* | 6/2013 | Saldana De Fuentes | G06F 15/7867 | 709/213 |
| 2013/0191823 A1* | 7/2013 | Davidson | H04L 67/34 | 717/178 |
| 2013/0212255 A1* | 8/2013 | Chao | H04L 41/083 | 709/224 |
| 2013/0232246 A1* | 9/2013 | Miller | G06F 8/71 | 709/222 |
| 2013/0263113 A1* | 10/2013 | Cavazza | G06F 8/63 | 717/178 |
| 2013/0346987 A1* | 12/2013 | Raney | G06F 9/5044 | 718/102 |
| 2014/0245264 A1* | 8/2014 | Bartley | G06F 8/70 | 717/124 |
| 2014/0272894 A1* | 9/2014 | Grimes | G09B 5/08 | 434/350 |
| 2014/0282413 A1* | 9/2014 | Grimme | G06F 8/60 | 717/124 |

* cited by examiner

UTILIZING DEMONSTRATION DATA BASED ON DYNAMICALLY DETERMINING FEATURE AVAILABILITY

TECHNOLOGICAL FIELD

The present technology relates generally to interacting with computer systems and, more specifically, to selectively utilizing demonstration data based on dynamically determining feature availability on computer systems.

BACKGROUND

In some applications, management servers can be used for managing back-end computer systems, such as storage systems, storage arrays, back-end servers, etc. A management server can interact with back-end computer systems to facilitate the configuration, operation, and monitoring of the back-end computer systems. The management server can send requests to the back-end computer systems to invoke features of the back-end computer systems (e.g., a feature can include the back-end system performing a function and/or providing information about the configuration or operation of the back-end system). As an example application, a client device can connect to a management server to obtain information (e.g., performance information, such as utilization, capacity, etc.) about back-end computer systems. The management server can request the information from the back-end computer systems by invoking features on the back-end computer systems and provide the information about the back-end computer systems' performance to the client device for, e.g., display through a GUI. However, in some instances, a feature can be unsupported by a back-end computer system (e.g., the back-end system does not yet have software to implement the feature), and impact the operation of the management server.

SUMMARY OF THE INVENTION

Accordingly, there is a need for technology to facilitate management servers' interacting with back-end computer systems that might not support one or more features.

In one aspect, there is a method performed by a management server. The method can include receiving, by the management server, a first request from a client device for computer system feature data related to a computer system feature. The method can include sending, lay the management server, a second request to a computer system to invoke by the computer system the computer system feature. The method can include receiving, by the management server, from the computer system, in response to the second request, response computer system feature data including feature status information. The method can include forming, by the management server, the computer system feature data based on the response computer system feature data, if the feature status information indicates that the computer system feature is available on the computer system. The method can include forming, by the management server, the computer system feature data based on demonstration data, if the feature status information indicates that the computer system feature is not available on the computer system. The method can include sending, by the management server, the computer system feature data to the client device.

In some embodiments, the method includes receiving, by the management server, a third request from the client device for second computer system feature data related to the computer system feature. In some embodiments, the method includes sending, by the management server, a fourth request to a second computer system to invoke by the second computer system the computer system feature. In some embodiments, the method includes receiving, by the management server, from the second computer system in response to the fourth request second response computer system feature data including second feature status information. In some embodiments, the method includes forming, by the management server, the second computer system feature data based on the second response computer system feature data, if the second feature status information indicates that the second computer system feature is available on the second computer system. In some embodiments, the method includes forming, by the management server, the second computer system feature data based on second demonstration data, if the second feature status information indicates that the second computer system feature is not available on the second computer system. In some embodiments, the method includes sending, by the management server, the second computer system feature data to the client device.

In some embodiments, the demonstration data and the second demonstration data are the same. In some embodiments, the method includes retrieving, by the management server, the demonstration data from a file stored on the management server. In some embodiments, the method includes retrieving, by the management server, the demonstration data from a remote repository. In some embodiments, the method includes dynamically generating, by the management server, the demonstration data. In some embodiments, the method includes retrieving, by the management server, the demonstration data based on one or more configuration parameters.

In another aspect, there is a computer program product, tangibly embodied in a non-transitory computer readable storage medium, including instructions being operable to cause one or more data processing apparatus to: receive a first request from a client device for computer system feature data related to a computer system feature; send a second request to a computer system to invoke by the computer system the computer system feature; receive from the computer system, in response to the second request, response computer system feature data including feature status information; form the computer system feature data based on the response computer system feature data, if the feature status information indicates that the computer system feature is available on the computer system; form the computer system feature data based on demonstration data, if the feature status information indicates that the computer system feature is not available on the computer system; and send the computer system feature data to the client device.

In some embodiments, the computer program product includes instructions being, operable to cause the one or more data processing apparatus to: receive a third request from the client device for second computer system feature data related to the computer system feature; send a fourth request to a second computer system to invoke by the second computer system the computer system feature; receive from the second computer system in response to the fourth request second response computer system feature data including second feature status information; form the second computer system feature data based on the second response computer system feature data, if the second feature status information indicates that the second computer system feature is available on the second computer system; form the second computer system feature data based on second demonstration data, if the second feature status information indicates that the second computer system feature is not available on the second computer system; and send the second computer system feature data to the client device.

In some embodiments the demonstration data and the second demonstration data are the same. In some embodiments, the computer program product includes instructions being operable to cause the one or more data processing apparatus to retrieve the demonstration data from a file stored on the management server. In some embodiments, the computer program product includes instructions being operable to cause the one or more data processing apparatus to retrieve the demonstration data from a remote repository. In some embodiments, the computer program product includes instructions being operable to cause the one or more data processing apparatus to dynamically generate the demonstration data. In some embodiments, the computer program product includes instructions being operable to cause the one or more data processing apparatus to retrieve the demonstration data based on one or more configuration parameters.

In another aspect, there is a system including a management server module configured to: receive a first request from a client device for computer system feature data related to a computer system feature; send a second request to a computer system to invoke by the computer system the computer system feature; receive from the computer system, in response to the second request, response computer system feature data including feature status information; form the computer system feature data based on the response computer system feature data, if the feature status information indicates that the computer system feature is available on the computer system; form the computer system feature data based on demonstration data, if the feature status information indicates that the computer system feature is not available on the computer system; and send the computer system feature data to the client device.

In some embodiments, the management server module is further configured to: receive a third request from the client device for second computer system feature data related to the computer system feature; send a fourth request to a second computer system to invoke by the second computer system the computer system feature; receive from the second computer system in response to the fourth request second response computer system feature data including second feature status information; form the second computer system feature data based on the second response computer system feature data, if the second feature status information indicates that the second computer system feature is available on the second computer system; form the second computer system feature data based on second demonstration data, if the second feature status information indicates that the second computer system feature is not available on the second computer system; and send the second computer system feature data to the client device.

In some embodiments, the management server module is further configured to retrieve the demonstration data from a file stored on the management server. In some embodiments, the management server module is further configured to retrieve the demonstration data from a remote repository. In some embodiments, the management server module is further configured to dynamically generate the demonstration data. In some embodiments, the management server module is further configured to retrieve the demonstration data based on one or more configuration parameters. Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which.

DETAILED DESCRIPTION

The technology described herein facilitates management servers' interacting with computer systems by selectively utilizing demonstration data based on dynamically determining feature availability on the computer systems. As an exemplary implementation of the technology, a management server can provide a web-based interface. A client device can access the web-based interface on the management server to obtain information, such as utilization data, about back-end computer systems. In order to provide the utilization data to the client device, the management server can query each of the back-end computer systems for utilization data. The management server can determine dynamically, for each of the back-end computer systems whether the utilization data feature is available. Each of the back-end computer systems for which the utilization data feature is available can provide the actual, run-time utilization data to the management server. For each of the back-end computer systems for which the utilization data feature is unavailable the management server can obtain demonstration data. The management server can provide to the client device through the web-based interface the actual, run-time utilization data for the back-end computer systems for which the utilization data feature is available and the demonstration data for the back-end computer systems for which the utilization data feature is unavailable. Beneficially, the technology facilitates the management server interacting with computer systems that do not support all of the features supported by the management server. As another exemplary implementation of the technology, the technology can be used to test, e.g., user interface elements related to a computer system feature before the feature has been implemented on the computer system.

Figure 1:
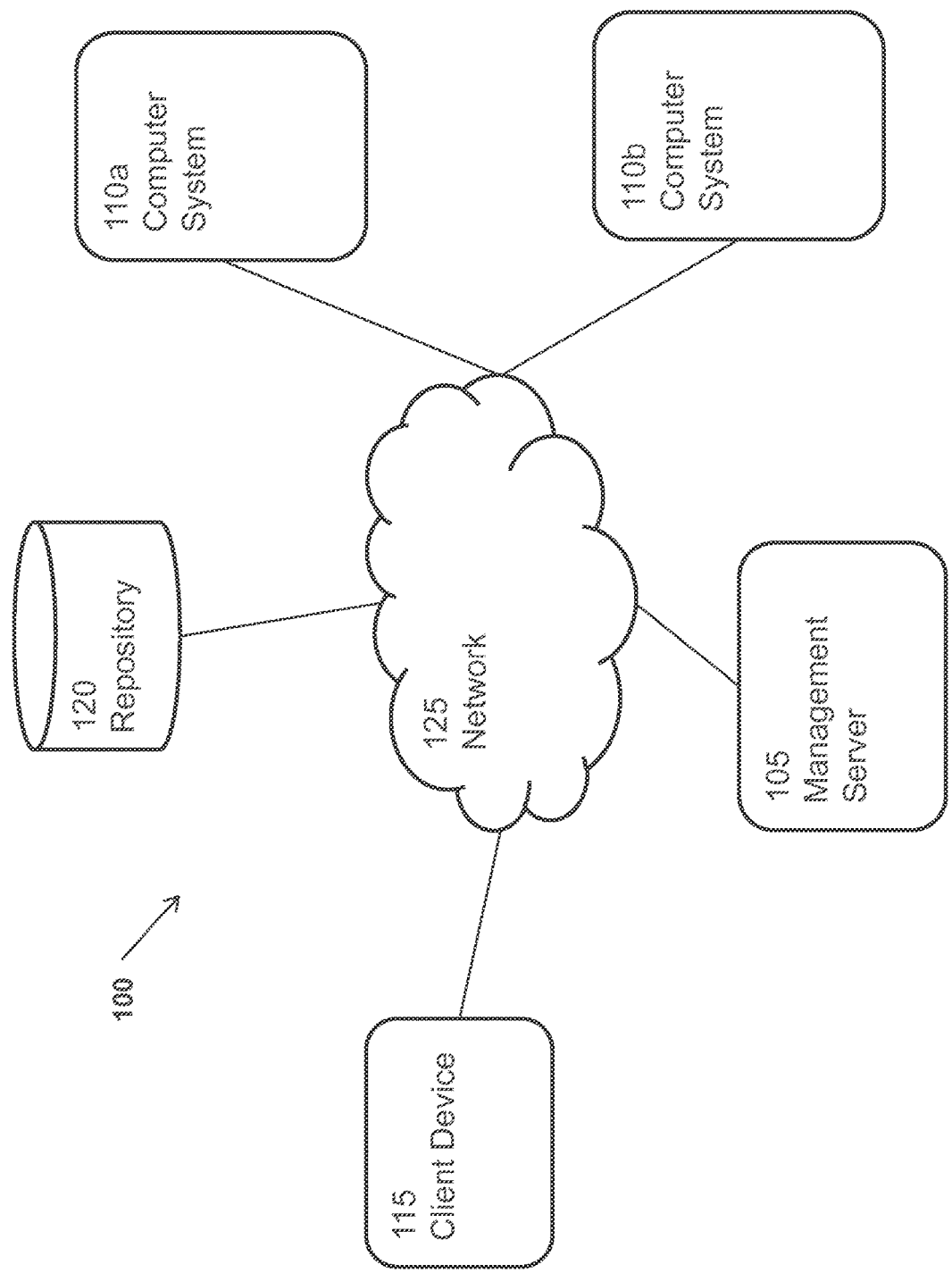
FIG. 1 depicts a system in accordance with the technology.

FIG. 1 depicts system 100 in accordance with the technology. System 100 includes management server 105, computer systems 110, client device 115, and repository 120. In system 100, server 105, computer systems 110, client device 115, and repository 120 can be in data communication with each other via network 125. Server 105, computer systems 110, client device 115, and repository 120 can each be any computing system comprising one or more computing devices. It should be appreciated that system 100 is an exemplary system in accordance with the technology, and other configurations are contemplated. For example, the management server can be a software module running on a back-end server or a client device. The repository can be a software module running on a back-end server, a management, or a client device. The repository can be a file on a back-end server, a management, or a client device.

Figure 2:
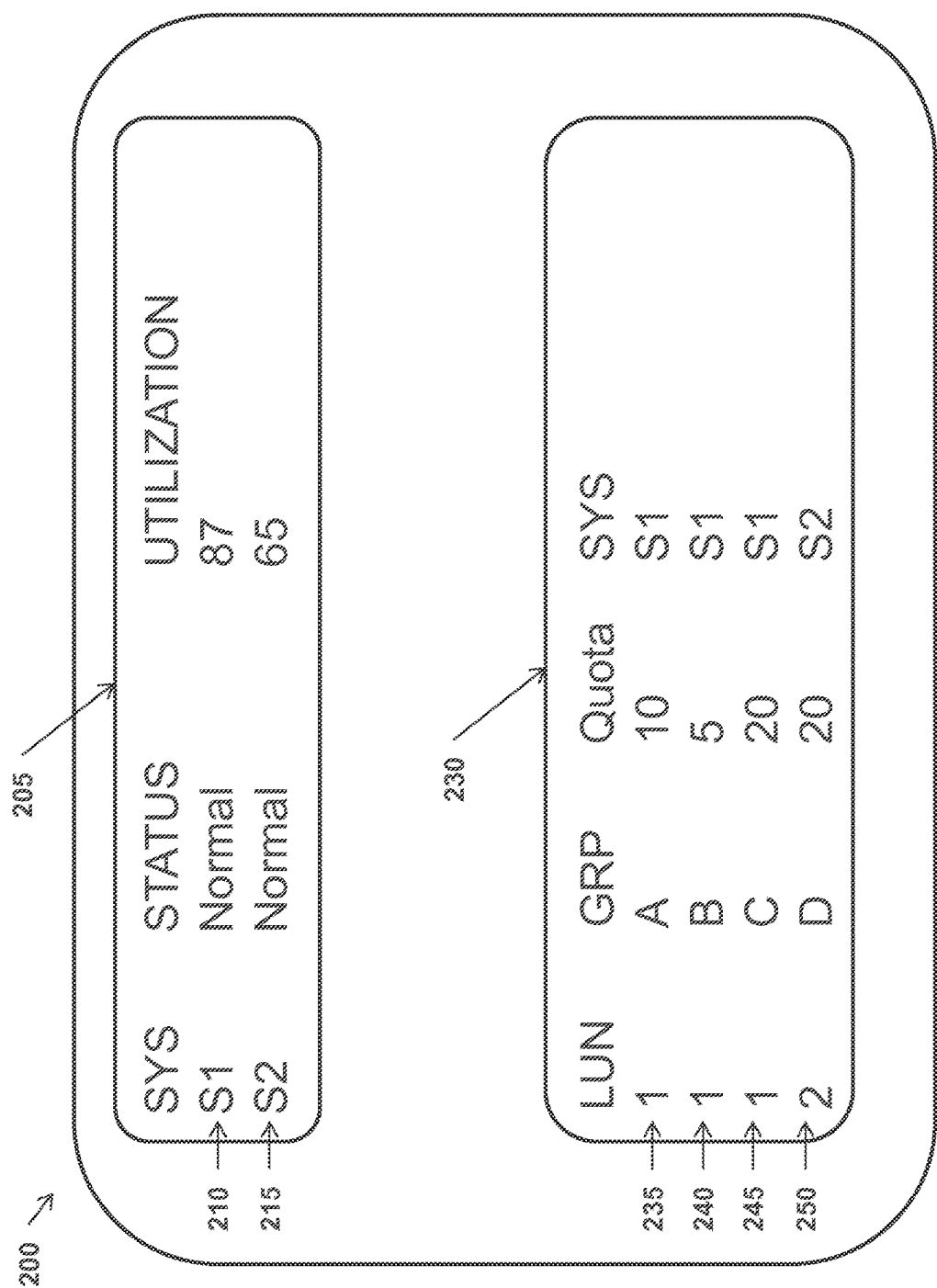
FIG. 2 depicts a screen displaying computer system feature data in accordance with the technology.

FIG. 2 depicts screen 200 displaying computer system feature data in accordance with the technology. For example, screen 200 can be displayed by client device 115, and can contain computer system feature data provided to client device 115 by management server 105. Management server 105 can obtain the displayed computer system feature data from computer systems 110 and/or demonstration data sources (e.g., repository 120). As illustrated, screen 200 includes status/utilization data 205. Status/utilization data 205 includes entry 210 showing that system "S1" (e.g., computer system 110a) has status "Normal" and a utilization of "87" percent. Status/utilization data 205 includes entry 215 showing that system "S2" (e.g., computer system 110a) has status "Normal" and a utilization of "65" percent. Screen 200 includes quota data 230. Quota data 230 includes entry 235 showing that on logical unit number (LUN) "1," Group "A" has a quota of "10" gigabytes, and LUN "1" is on system "S1." Quota data 230 includes entry 240 showing that on LUN "1," Group "B" has a quota of "5" gigabytes. Quota data 230 includes entry 245 showing that on LUN "1," Group "C" has a quota of "20" gigabytes. Quota data 230 includes entry 250 showing that on LUN "2," Group "D" has a quota of "20" gigabytes, and LUN "2" is on system "S2."

Figure 3:
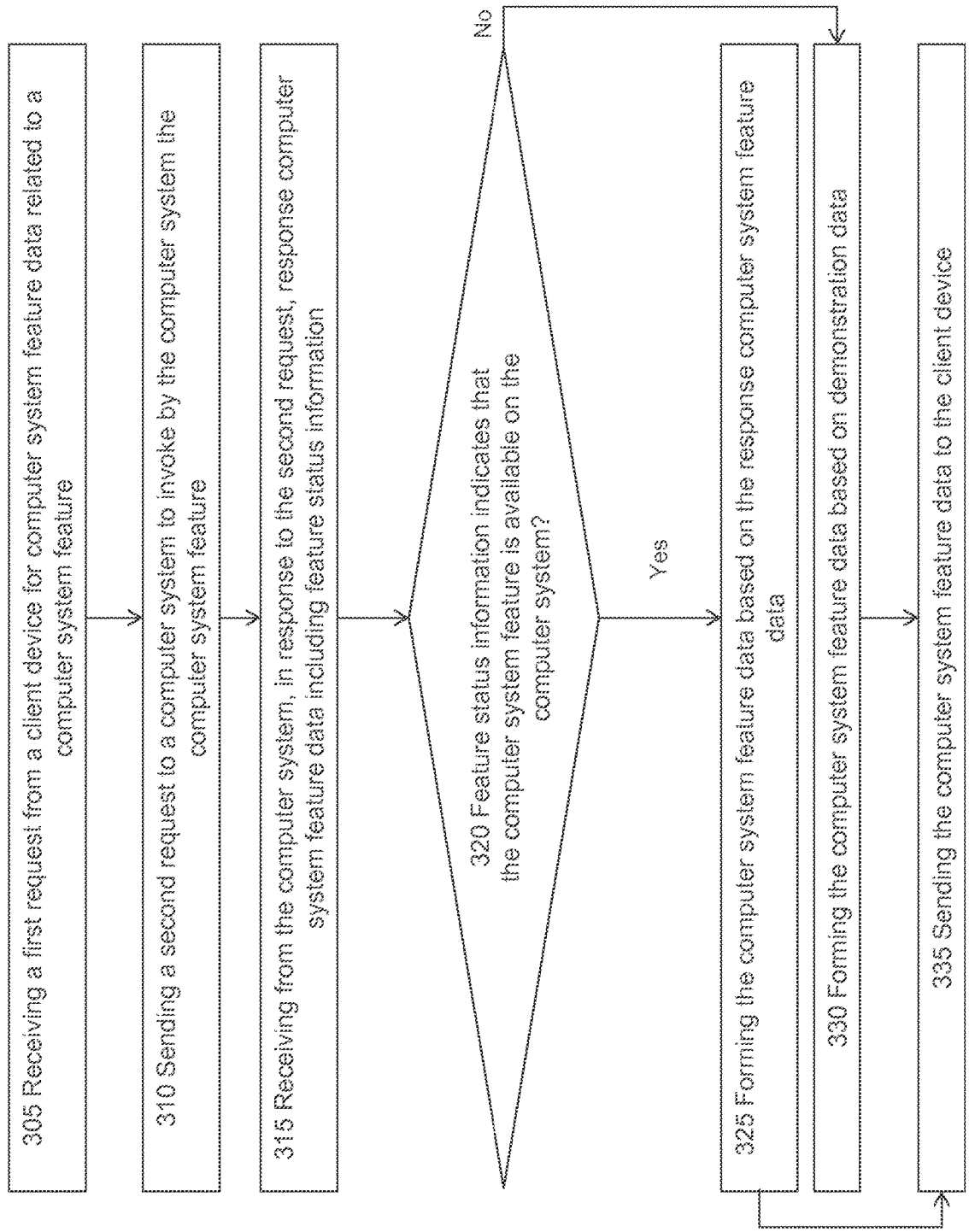
FIG. 3 is a flow chart depicting a method performed by a management server in accordance with the technology.

FIG. 3 is a flow chart depicting a method performed by a management server in accordance with the technology. For example, the illustrated method can be executed by management server 105. At step 305, the management server receives a first request front a client device for computer system feature data related to a computer system feature. For example, and with reference to FIG. 2, the management server can receive a request from a client device for status/utilization data 205 for computer system "S1." At step 310, the management server sends a second request to a computer system to invoke by the computer system the computer system feature. For example, and with reference to FIG. 2, the management server can send a request to computer system "S1" to invoke by the computer system the status/utilization feature. In some embodiments, the management server can invoke the computer system feature by sending a request in accordance with a public API provided by the computer system (e.g., an API provided by a storage system, server, etc.). At step 315, the management server receives from the computer system, in response to the second request, response computer system feature data including feature status information. The response computer system feature data can include feature status information, such as a response code indicating whether the computer system successfully invoked the computer system feature. For example, and with reference to FIG. 2, the management server can receive from system "S1" response computer system feature data including, feature status information. If the status utilization feature is available and/or supported by system "S1" response computer system feature data can include the information displayed in entry 210 and the feature status information can indicate that system "S1" invoked the status/utilization feature. If the status/utilization feature is not available and/or not supported by system "S1," the feature status information can indicate the status/utilization feature is unavailable.

At step 320, the management server deter mines whether the feature status information indicates that the computer system feature is available on the computer system. If the feature status information indicates that the computer system feature is available on the computer system, the method proceeds to step 325. At step 325, the management server forms the computer system feature data based on the response computer system feature data. For example, and with reference to FIG. 2, the management server can form the computer system feature data including the information displayed in entry 210 based on status/utilization data provided by system "S1". The method proceeds to step 335. At step 335, the management server sends the computer system feature data to the client device. For example, and with reference to FIG. 2, the management serve can send the status/utilization information displayed in entry 210 to the client device.

If the feature status information indicates that the computer system feature is unavailable on the computer system, the method proceeds to step 330. At step 330, the management server forms the computer system feature data based on demonstration data. Demonstration data for a computer system can be any computer system feature data other than computer system feature data provided by the computer system based on its current operation or configuration. For example, demonstration data can be any non-live computer system feature data, such as previously generated sample computer system feature data, dynamically generated sample computer system feature data, previously generated computer system feature data collected from a different computer system, mock computer system feature data, and/or computer system feature data comprising test values. Demonstration data can be retrieved from a file located on the management server or retrieved from a remote source (e.g., repository), in some embodiments, the management server can select demonstration data based on one or more configuration parameters. For example, the management server can be configured to select between a large demonstration data set or a small demonstration data set (e.g., for testing purposes). At step 335, the management server sends the computes system feature data to the client device.

It should be appreciated that technology described herein permits mixing computer system feature data based on live computer system data and computer system feature data based on demonstration data. For example, and with reference to FIG. 2, entry 210 can be based on live system data from system "S1," and entry 215 can be based on demonstration data (e.g., if system "S2" does not support the status utilization feature).

Figure 4:
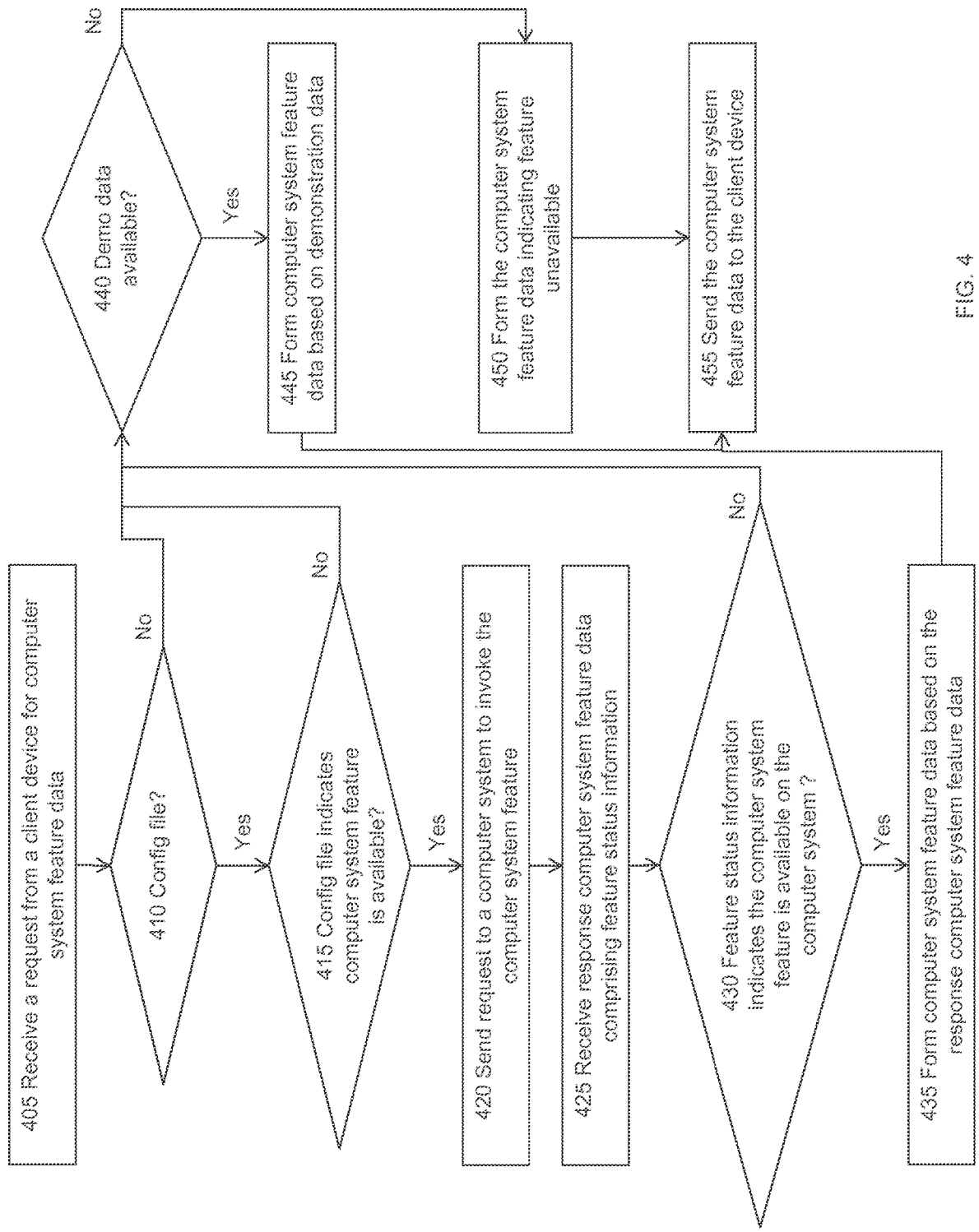
FIG. 4 is a flow chart depicting a method performed by a management server accordance with the technology.

FIG. 4 is a flow chart depicting a method performed by a management server in accordance with the technology. In the illustrated method, the management server can use a hierarchical model for providing computer system feature data. At step 405, the management server receives a request from a client device for computer system feature data. At step 410, the management server determines whether a configuration file is available. If there is not a configuration file available, the method proceeds to step 440. In some embodiments, the method can proceed to step 420 if there is not a configuration file available. If there is a configuration file, the method proceeds to step 415.

At step 415, the management server determines whether the configuration file indicates the computer system feature is available. If the configuration file indicates the computer system feature is not available, the method proceeds to step 440. If the configuration file indicates the computer system feature is available, the method proceeds to step 420. At step 420, the management server sends a request to a computer system to invoke the computer system feature. At step 425, the management server receives response computer system feature data comprising feature status information. At step 430, the management server determines whether the feature status information indicates the computer system feature is available on the computer system. If the feature status information indicates the computer system feature is not available on the computer system, the method proceeds to step 440. If the feature status information indicates the computer system feature is available on the computer system, the method proceeds to step 435. At step 435, the management server forms computer system feature data based on the response computer system feature data. The method proceeds to step 455.

At step 440, the management server determines if demonstration data is available. If demonstration data is available, the method proceeds to step 445. At step 445, the management server forms computer system feature data based on demonstration data, and the method proceeds to step 455. If demonstration data is not available, the method proceeds to step 450. At step 450, the management servers forms the computer system feature data indicating the feature is unavailable, and the method proceeds to step 455.

At step 455, the management server sends the computer system feature data to the client device.

Figure 5:
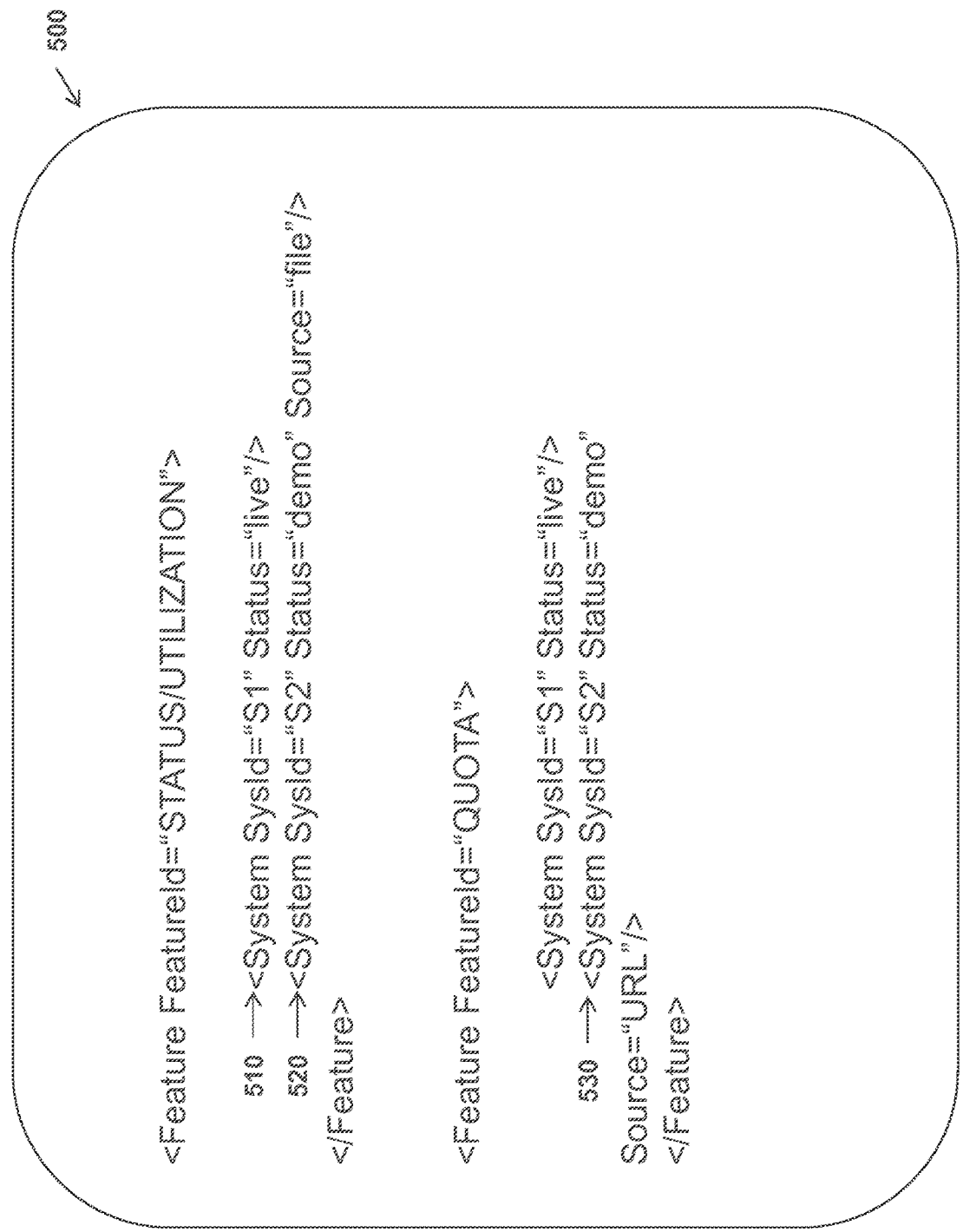
FIG. 5 depicts a configuration file in accordance with the technology.

FIG. 5 depicts configuration file 500 in accordance with the technology. In some embodiments, a management server can use configuration file 500 as described in step 415 of FIG. 4. Configuration file 500 indicates for which computer system features the management server can send a request to a computer system to invoke by the computer system the computer system feature. For example, entry 510 indicates the management server can send a request to system "S1" to invoke the status/utilization feature. Entry 520 indicates the management server can use demonstration data to provide status/utilization data for system "S2," and indicates the source of the demonstration data (e.g., a local file). Entry 530 indicates the management server can use demonstration data to provide quota data for system "S2," and indicates the source of the demonstration data (e.g., a URL pointing to a remote system).

The above-described techniques can be implemented in digital and/or analog electronic, circuitry, or in computer hardware, firmware, software, or in combinations of them. The implementation can be as a computer program product, a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be, performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g. internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of a computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (CPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Hypertext Transfer Protocol (HTTP), Session Initiation Protocol (SIP), a Global System for Mobile Communications (GSM) protocol, Universal Mobile Telecommunications System (UMTS), 3GPP Long Term Evolution (LTE) and/or other communication protocols.

Devices of a computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device includes, for example, a Blackberry® from Research in Motion, an iPhone® from Apple Corporation, and/or an Android™-based device.

Comprise, include, and/or plural forms of each are open ended and include the listed parts and can include additional parts that are not listed. And/or is open ended and includes one or more of the listed parts and combinations of the listed pans.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A method performed by a management server comprising:
   receiving, at the management server, a first request from a client device for computer system feature data related to a computer system feature;
   sending, by the management server, a second request to a computer system to invoke, by the computer system, the computer system feature;
   receiving, at the management server from the computer system in response to the second request, response computer system feature data including feature status information;
   determining, by the management server, whether or not the feature status information indicates that the computer system feature is available on the computer system;
   having determined that the feature status information indicates that the computer system feature is available on the computer system:
      (i) obtaining, by the management server, live computer system data from the response computer system feature data received from the computer system, the live computer system data pertaining to the computer system feature that is available on the computer system; and
      (ii) forming, by the management server, the computer system feature data based on the live computer system data;
   having determined that the feature status information indicates that the computer system feature is not available on the computer system:
      (i) obtaining, by the management server, non-live computer system data from other than the response computer system feature data received from the computer system, the non-live computer system data including one or more of dynamically generated sample computer system feature data and mock computer system feature data; and
      (ii) forming, by the management server, the computer system feature data based on the non-live computer system data; and
   sending, by the management server, the computer system feature data to the client device.

2. The method of claim 1, further comprising:
   receiving, by the management server, a third request from the client device for second computer system feature data related to the computer system feature;
   sending, by the management server, a fourth request to a second computer system to invoke by the second computer system the computer system feature;
   receiving, by the management server, from the second computer system in response to the fourth request second response computer system feature data comprising second feature status information;
   if the second feature status information indicates that the second computer system feature is available on the second computer system:
      (i) obtaining, by the management server, second live computer system data from the second response computer system feature data; and
      (ii) forming, by the management server, the second computer system feature data based on the second live computer system data;
   if the second feature status information indicates that the second computer system feature is not available on the second computer system:
      (i) obtaining, by the management server, second non-live computer system data; and
      (ii) forming, by the management server, the second computer system feature data based on the second non-live computer system data; and
   sending, by the management server, the second computer system feature data to the client device.

3. The method of claim 2, wherein the non-live computer system data and the second non-live computer system data are the same.

4. The method of claim 1, wherein the obtaining of the non-live computer system data includes retrieving, by the management server, the non-live computer system data from a file stored on the management server.

5. The method of claim 1, wherein the obtaining of the non-live computer system data includes retrieving, by the management server, the non-live computer system data from a remote repository.

6. The method of claim 1, wherein the obtaining of the non-live computer system data includes dynamically generating, by the management server, the non-live computer system data.

7. The method of claim 1, wherein the obtaining of the non-live computer system data includes retrieving, by the management server, the non-live computer system data based on one or more configuration parameters.

8. A computer program product, tangibly embodied in a non-transitory computer readable storage medium, including instructions being operable to cause one or more data processing apparatus to:
- receive a first request from a client device for computer system feature data related to a computer system feature;
- send a second request to a computer system to invoke, by the computer system, the computer system feature;
- receive from the computer system in response to the second request, response computer system feature data including feature status information;
- determine whether or not the feature status information indicates that the computer system feature is available on the computer system;
- having determined that the feature status information indicates that the computer system feature is available on the computer system:
  - (i) obtain live computer system data from the response computer system feature data received from the computer system, the live computer system data pertaining to the computer system feature that is available on the computer system; and
  - (ii) form the computer system feature data based on the live computer system data;
- having determined that the feature status information indicates that the computer system feature is not available on the computer system:
  - (i) obtain non-live computer system data from other than the response computer system feature data received from the computer system, the non-live computer system data including one or more of dynamically generated sample computer system feature data and mock computer system feature data; and
  - (ii) form the computer system feature data based on the non-live computer system data; and
- send the computer system feature data to the client device.

9. The computer program product of claim 8, further including instructions being operable to cause the one or more data processing apparatus to:
- receive a third request from the client device for second computer system feature data related to the computer system feature;
- send a fourth request to a second computer system to invoke by the second computer system the computer system feature;
- receive from the second computer system in response to the fourth request second response computer system feature data comprising second feature status information;
- if the second feature status information indicates that the second computer system feature is available on the second computer system:
  - (i) obtain second live computer system data from the second response computer system feature data; and
  - (ii) form the second computer system feature data based on the second live computer system data;
- if the second feature status information indicates that the second computer system feature is not available on the second computer system:
  - (i) obtain second non-live computer system data; and
  - (ii) form the second computer system feature data based on the second non-live computer system data; and
- send the second computer system feature data to the client device.

10. The computer program product of claim 9, wherein the non-live computer system data and the second non-live computer system data are the same.

11. The computer program product of claim 8, further including instructions being operable to cause the one or more data processing apparatus to retrieve the non-live computer system data from a file stored on the management server.

12. The computer program product of claim 8, further including instructions being operable to cause the one or more data processing apparatus to retrieve the non-live computer system data from a remote repository.

13. The computer program product of claim 8, further including instructions being operable to cause the one or more data processing apparatus to dynamically generate the non-live computer system data.

14. The computer program product of claim 8, further including instructions being operable to cause the one or more data processing apparatus to retrieve the non-live computer system data based on one or more configuration parameters.

15. The method of claim 1 wherein the live computer system data is based on one or more of (i) a current operation of the computer system and (ii) a current configuration of the computer system, and wherein the non-live computer system data is not based on either one of (i) the current operation of the computer system and (ii) the current configuration of the computer system.

16. A method performed by a management server, comprising:
- in response to a first request from a client device for computer system feature data related to a computer system feature, sending, by the management server, a second request to a computer system to invoke, by the computer system, the computer system feature;
- receiving, at the management server, feature status information from the computer system in response to the second request;
- determining that the computer system feature is not available on the computer system based on the feature status information;
- having determined that the computer system feature is not available on the computer system:
  - (i) obtaining, by the management server, non-live computer system data from other than the computer system, the non-live computer system data including one or more of dynamically generated sample computer system feature data and (d) mock computer system feature data; and
  - (ii) forming, by the management server, the computer system feature data based on the non-live computer system data; and
- sending, by the management server, the computer system feature data to the client device.

* * * * *